US012327702B2

(12) United States Patent
Ito et al.

(10) Patent No.: US 12,327,702 B2

(45) Date of Patent: Jun. 10, 2025

(54) BREAKER DEVICE

(71) Applicant: Panasonic Intellectual Property Management Co., Ltd., Osaka (JP)

(72) Inventors: Shun Ito, Hyogo (JP); Shinya Kimoto, Osaka (JP); Katsuya Uruma, Osaka (JP); Masato Nakamura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/720,985

(22) PCT Filed: Aug. 23, 2023

(86) PCT No.: PCT/JP2023/030347

§ 371 (c)(1),
(2) Date: Jun. 17, 2024

(87) PCT Pub. No.: WO2024/134983

PCT Pub. Date: Jun. 27, 2024

(65) Prior Publication Data

US 2024/0420905 A1 Dec. 19, 2024

(30) Foreign Application Priority Data

Dec. 23, 2022 (JP) ................................ 2022-206501

(51) Int. Cl.
*H01H 39/00* (2006.01)

(52) U.S. Cl.
CPC ................................ *H01H 39/006* (2013.01)

(58) Field of Classification Search
CPC ................ H01H 39/00–006; H01H 2039/008
See application file for complete search history.

(56) References Cited

U.S. PATENT DOCUMENTS

2005/0083165 A1* 4/2005 Tirmizi ................ H01H 39/006 337/157
2007/0034491 A1* 2/2007 Knauss ................ H01H 39/006 200/61.08

(Continued)

FOREIGN PATENT DOCUMENTS

JP 2021-166177 A 10/2021

OTHER PUBLICATIONS

International Search Report dated Oct. 3, 2023 issued in International Patent Application No. PCT/JP2023/030347.

*Primary Examiner* — Jacob R Crum
(74) *Attorney, Agent, or Firm* — Rimon P.C.

(57) ABSTRACT

This breaker device includes: a casing; an igniter disposed in the casing; a conductor including a separating portion disposed below the igniter; and a pusher located between the separating portion and the igniter and configured to move together with the separating portion from a first position to a second position located below the first position. The casing includes: a first casing made of a metal, including a first fixing portion, and configured to house the igniter and the pusher located at the first position; and a second casing made of a metal, including a second fixing portion, and configured to house the pusher that has moved to the second position and the separating portion that has moved downward together with the pusher. The first fixing portion and the second fixing portion overlap each other, come into contact with each other, and are fixed to each other.

20 Claims, 11 Drawing Sheets

(56) References Cited

U.S. PATENT DOCUMENTS

| | | | | |
|---|---|---|---|---|
| 2013/0263715 | A1* | 10/2013 | Ukon | H01H 39/006 83/639.1 |
| 2019/0206645 | A1* | 7/2019 | Sakai | H01H 33/04 |
| 2019/0287751 | A1* | 9/2019 | Gonthier | H01H 85/0241 |
| 2020/0035437 | A1* | 1/2020 | Gaudinat | H01H 39/00 |
| 2021/0407752 | A1* | 12/2021 | Gaudinat | B60L 3/04 |

* cited by examiner

BREAKER DEVICE

This application is the U.S. National Phase under 35 U.S.C. § 371 of International Patent Application No. PCT/JP2023/030347, filed on Aug. 23, 2023, which in turn claims the benefit of Japanese Patent Application No. 2022-206501, filed on Dec. 23, 2022, the entire disclosures of which Applications are incorporated by reference herein.

TECHNICAL FIELD

The present disclosure relates to breaker devices.

BACKGROUND ART

There are conventionally known breaker devices that, when in use, are connected to an electrical circuit. Such a breaker device includes: a casing; and a pusher that is disposed in the casing and moves from a first position to a second position with gas generated by an igniter when turned ON, and the pusher moving from the first position to the second position splits or cuts a conductor, thus interrupting an electrical path. The casing is formed by fixing a first casing and a second casing. For example, Patent Literature (PTL 1) discloses a breaker device in which two flanges (flange portions) that are formed on two respective cover members (casings) and between which a spacer made of a metal is disposed are joined together using screws.

CITATION LIST

Patent Literature

PTL 1: Unexamined Japanese Patent Publication No. 2021-166177

SUMMARY OF INVENTION

In the breaker device disclosed in PTL 1, the flanges for fixing the first casing and the second casing need to be provided, leading to an increase in the size of the breaker device, which is problematic.

Thus, the present disclosure provides a breaker device that is smaller than a conventional breaker device.

A breaker device according to one aspect of the present disclosure includes: a casing; an igniter disposed in the casing; a conductor including a separating portion disposed below the igniter; and a pusher located between the separating portion and the igniter and configured to move together with the separating portion from a first position to a second position located below the first position, wherein the casing includes: a first casing that is made of a metal, includes a first fixing portion, and is configured to house the igniter and the pusher located at the first position; and a second casing that is made of a metal, includes a second fixing portion, and is configured to house the pusher that has moved to the second position and the separating portion that has moved downward together with the pusher, and the first fixing portion and the second fixing portion overlap each other, come into contact with each other, and are fixed to each other.

According to one aspect of the present disclosure, it is possible to provide a breaker device that is smaller than a conventional breaker device.

DESCRIPTION OF EMBODIMENTS

Figure 1:
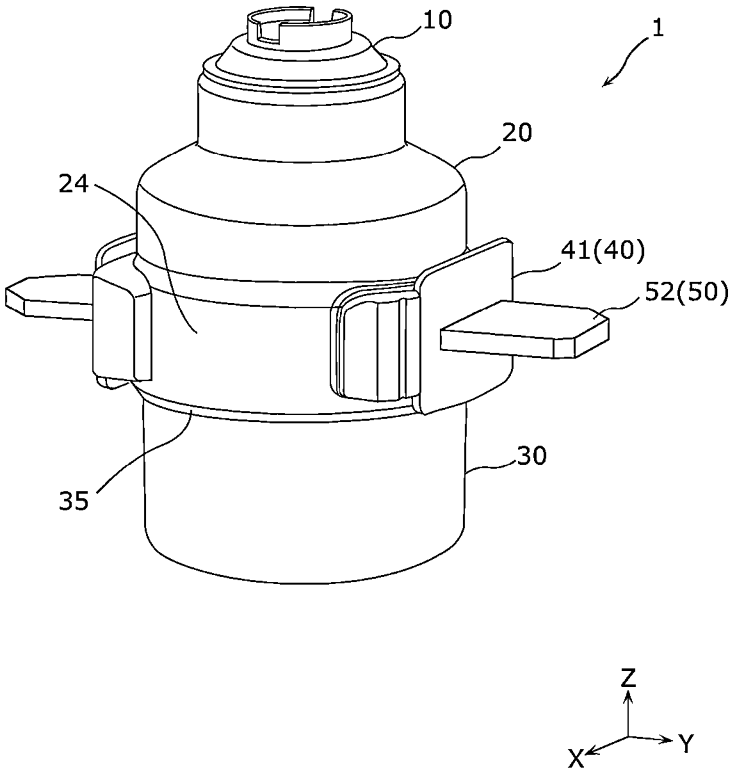
FIG. 1 is a perspective view illustrating a breaker device according to an exemplary embodiment.

A breaker device according to one aspect of the present disclosure includes: a casing; an igniter disposed in the casing; a conductor including a separating portion disposed below the igniter; and a pusher located between the separating portion and the igniter and configured to move together with the separating portion from a first position to a second position located below the first position, wherein the casing includes: a first casing that is made of a metal, includes a first fixing portion, and is configured to house the igniter and the pusher located at the first position; and a second casing that is made of a metal, includes a second fixing portion, and is configured to house the pusher that has moved to the second position and the separating portion that has moved downward together with the pusher, and the first fixing portion and the second fixing portion overlap each other, come into contact with each other, and are fixed to each other.

With this configuration, the first casing and the second casing are fixed in contact with each other at overlapping portions, and thus there is no need to provide flanges for fixing with screws on the first casing and the second casing, resulting in a breaker device that is smaller than a conventional breaker device.

It is preferable that the first casing include: a first body portion configured to house the igniter and the pusher located at the first position; and a first fixing portion that protrudes downward from the first body portion, and the second casing include: a second body portion located below the first body portion and configured to house the pusher that has moved to the second position and the separating portion that has moved downward together with the pusher; and a second fixing portion that protrudes upward from the second body portion.

With this configuration, the fixing portions protruding upward and downward are fixed to each other, resulting in an even smaller breaker device.

It is preferable that the first casing further include a third fixing portion that protrudes downward from the first body portion and opposes the first fixing portion, and the second casing further include a fourth fixing portion that protrudes upward from the second body portion, opposes the second fixing portion, overlaps the third fixing portion, comes into contact with the third fixing portion, and is fixed to the third fixing portion.

With this configuration, fixing is achieved in an area where the third fixing portion and the fourth fixing portion overlap in addition to an area where the first fixing portion and the second fixing portion overlap, making it easy to distribute stress imposed on the second casing to the first casing. Thus, it is possible to improve the strength of the breaker device.

It is preferable that the breaker device further include: a resin member in which the conductor is embedded, the resin member including an inner side wall facing an outer side wall of the pusher and a first outer side wall disposed in the casing and covered by the first casing; and a first elastic member disposed between the first casing and the first outer side wall of the resin member.

With this configuration, when the internal pressure in the casing increases due to, for example, gas generated by the igniter or an electric arc generated when the pusher cuts off the separating portion, the resin member is pressed outward and the first casing is pressed upward due to the increase in pressure; as a result, with the resin member and the first casing, the first elastic member is further pressed compared to the initial state. Thus, it is possible to reduce leakage of high-temperature gas to the outside of the breaker device through the spacing between the resin member and the first casing.

It is preferable that the breaker device further include: a resin member in which the conductor is embedded, the resin member including a second outer side wall disposed in the casing and covered by the second casing; and a second elastic member disposed between the second casing and the second outer side wall of the resin member.

With this configuration, when the internal pressure in the casing increases due to, for example, gas generated by the igniter or an electric arc generated when the pusher cuts off the separating portion, the resin member is pressed outward and the second casing is pressed downward due to the increase in pressure; as a result, with the resin member and the second casing, the second elastic member is further pressed compared to the initial state. Thus, it is possible to reduce leakage of high-temperature gas to the outside of the breaker device through the spacing between the resin member and the second casing.

Note that the first fixing portion described above may be disposed outward of the second fixing portion.

With this configuration, the breaker device configured so that the first fixing portion is disposed outward of the second fixing portion can be made smaller than a conventional breaker device.

Note that the first fixing portion described above may be disposed inward of the second fixing portion.

With this configuration, the breaker device configured so that the first fixing portion is disposed inward of the second fixing portion can be made smaller than a conventional breaker device.

Note that in the above-described breaker device, after the pusher cuts off the separating portion from the conductor, the separating portion may move downward together with the pusher.

Hereinafter, an exemplary embodiment will be specifically described with reference to the drawings.

Note that each exemplary embodiment described below shows a general or specific example. The numerical values, shapes, structural elements, the arrangement and connection of the structural elements, steps (manufacturing steps), the processing order of the steps (manufacturing steps), etc., shown in the following exemplary embodiment are mere examples, and are not intended to limit the present disclosure. Therefore, among the structural elements in the following exemplary embodiment, structural elements not recited in any one of the independent claims are described as optional structural elements.

Note that the figures are schematic diagrams and are not necessarily precise illustrations. Therefore, for example, scale reduction and the like in the figures are not necessarily the same. Furthermore, in the figures, substantially identical elements are assigned the same reference signs, and overlapping description will be omitted or simplified.

In the present specification and the drawings, the X-axis, the Y-axis, and the Z-axis represent three axes of the right-handed three-dimensional Cartesian coordinate system. In the exemplary embodiment, the Z-axis direction is a direction of movement of the pusher, the Y-axis direction is a direction in which the conductor extends, and the X-axis direction is the width direction of the conductor. In the present specification, the phrase "as viewed from above" indicates viewing from the positive side of the Z-axis to the negative side of the Z-axis, the phrase "in a cross-sectional view" indicates viewing a cut surface of the breaker device that has been cut through by a plane extending through the Z-axis and parallel to the Z-axis, and the term "lateral" indicates a direction orthogonal to the Z-axis direction. In the present specification, the Z-axis direction is also referred to as an up-down direction. The up-down direction of the breaker device in the present specification merely indicates relative positioning of elements included in the breaker device for the sake of description of the exemplary embodiment. For example, in the present specification, the terms "up/upward/above/top" and "down/downward/below/bottom" do not indicate an upward direction (vertically upward) and a downward direction (vertically downward) in a sense of absolute space, but are used as terms defined by relative positioning on the basis of the direction of movement of the pusher. The posture of the breaker device when installed is not limited by the directions illustrated in the drawings.

Furthermore, in the present specification, terms indicating the relationship between elements such as being equal, terms indicating the shapes of elements such as a circular column and a square, numerical values, and numerical ranges are not expressions referring to only exact meanings, but are expressions referring to substantially equivalent ranges including, for example, approximately a few percent (or approximately 10%) differences.

Furthermore, in the present specification, ordinal numbers such as "first" and "second" do not indicate the number of structural elements or the sequence of structural elements, but are used for the purpose of avoiding confusion and distinguishing between structural elements of the same kind, unless otherwise noted.

Exemplary Embodiment

Hereinafter, the breaker device according to the present exemplary embodiment will be described with reference to FIG. 1 to FIG. 4, FIG. 6, and FIG. 7.

[1. Configuration of Breaker Device]

Figure 2A:
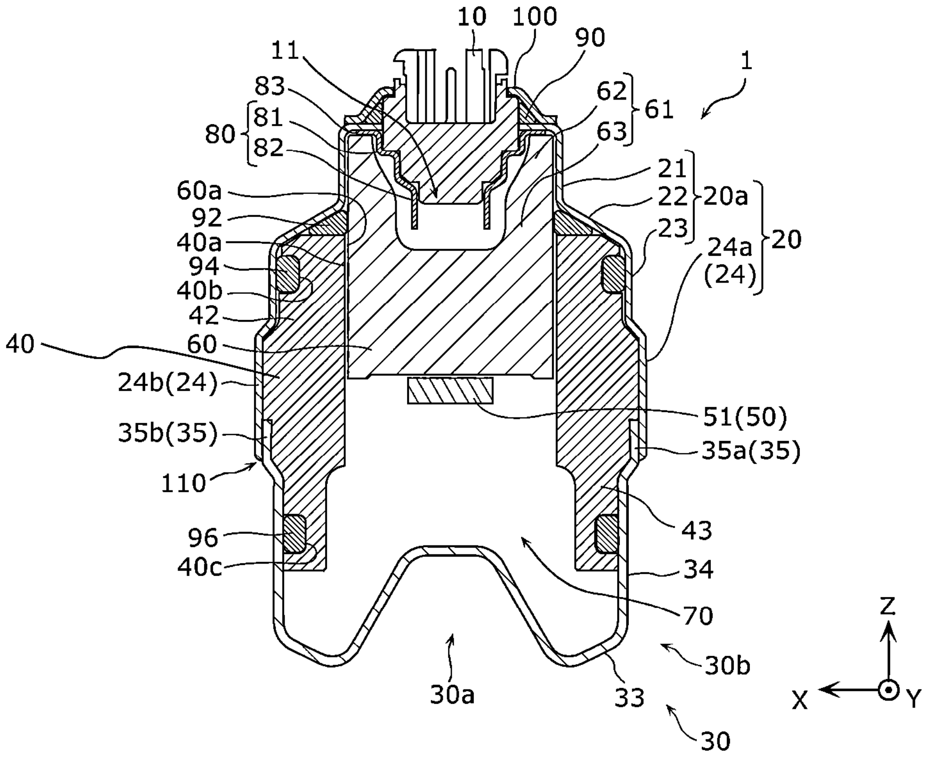
FIG. 2A is a cross-sectional view illustrating the configuration of a breaker device according to an exemplary embodiment before an interrupting operation.
Figure 2B:
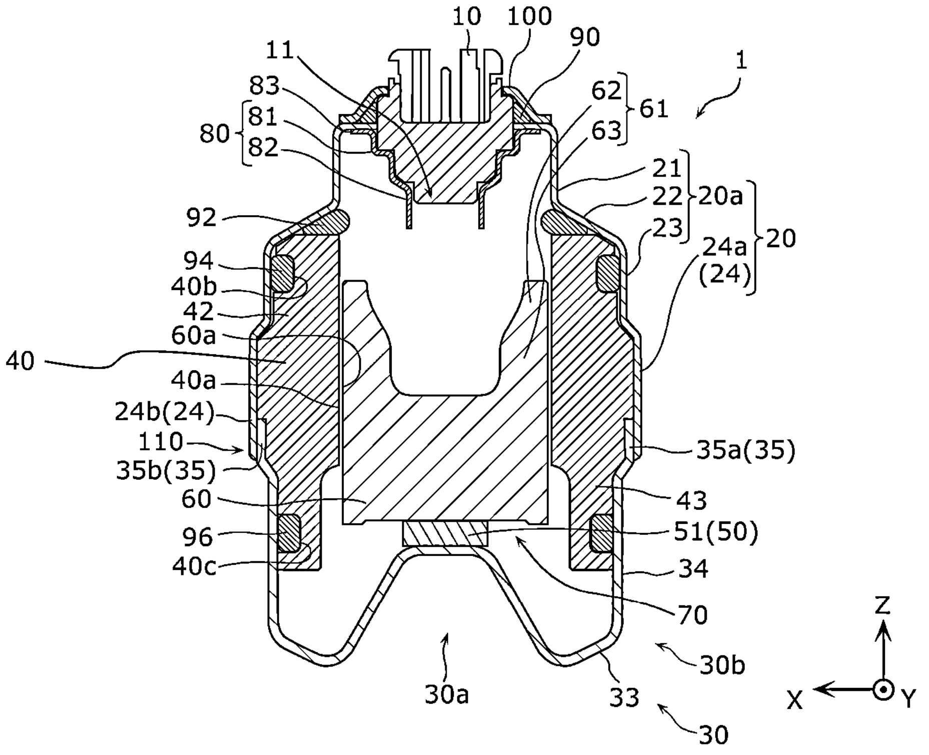
FIG. 2B is a cross-sectional view illustrating the configuration of a breaker device according to an exemplary embodiment after an interrupting operation.
Figure 6:
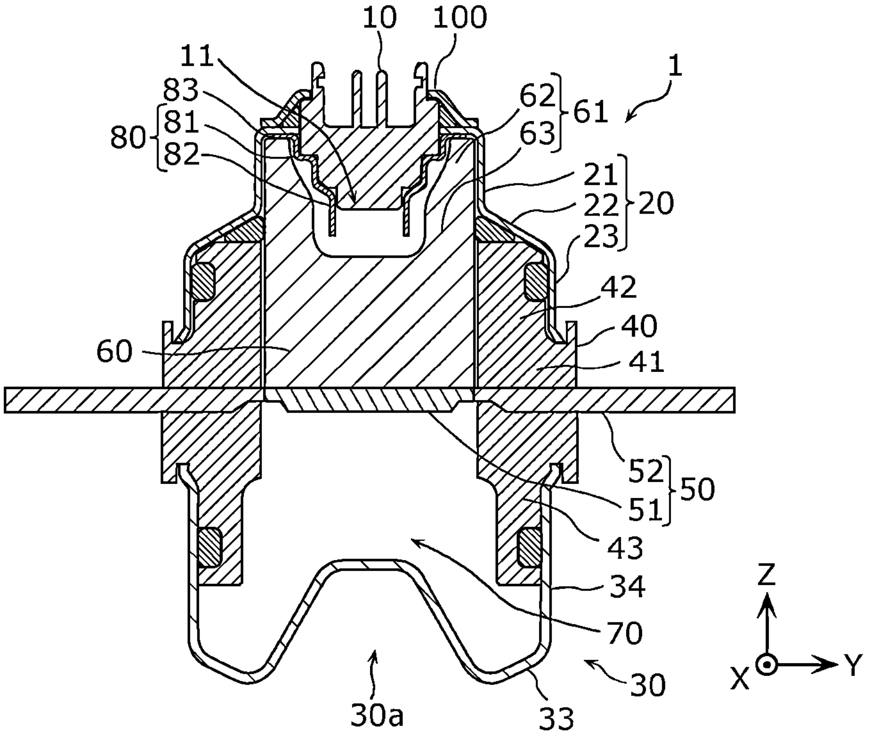
FIG. 6 is a cross-sectional view illustrating the configuration of a breaker device according to an exemplary embodiment before an interrupting operation.
Figure 7:
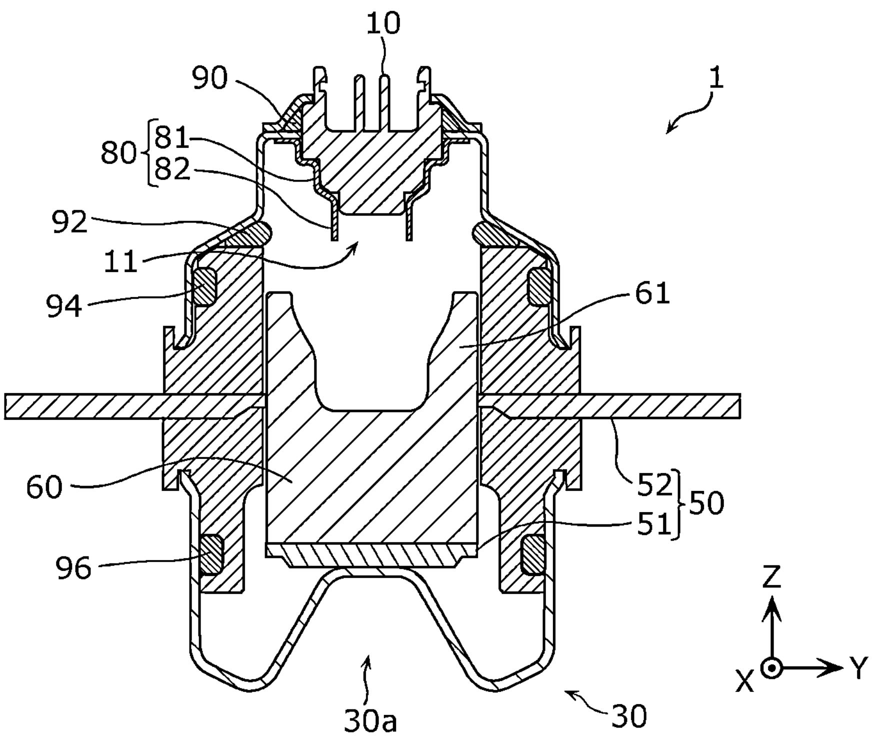
FIG. 7 is a cross-sectional view illustrating the configuration of a breaker device according to an exemplary embodiment after an interrupting operation.

First, the configuration of the breaker device according to the present exemplary embodiment will be described with reference to FIG. 1 to FIG. 3, FIG. 6, and FIG. 7. FIG. 1 is a perspective view illustrating breaker device 1 according to the present exemplary embodiment. FIG. 2A and FIG. 6 are cross-sectional views illustrating the configuration of breaker device 1 according to the present exemplary embodiment before an interrupting operation. FIG. 2B and FIG. 7 are cross-sectional views illustrating the configuration of breaker device 1 according to the present exemplary embodiment after the interrupting operation.

FIG. 1 illustrates breaker device 1 that has rotated around the Z-axis as an axis of rotation from the state thereof in a front view, assuming that a view projected in the X-axis direction is a front view. FIG. 2A is a cross-sectional view of breaker device 1 during a non-interrupting operation (in the initial state) when taken along the XZ plane, and FIG. 6 is a cross-sectional view of breaker device 1 during a non-interrupting operation (in the initial state) when taken along the YZ plane. The position of pusher 60 illustrated in FIG. 2A and FIG. 6 is one example of the first position (the initial position). FIG. 2B is a cross-sectional view of breaker device 1 after the interrupting operation when taken along the XZ plane, and FIG. 7 is a cross-sectional view of breaker device 1 after the interrupting operation when taken along the YZ plane. The position of pusher 60 illustrated in FIG. 2B and FIG. 7 is one example of the second position.

As illustrated in FIG. 1 to FIG. 2B, breaker device 1 includes igniter 10, upper casing 20, lower casing 30, resin member 40, conductor 50, pusher 60, protective portion 80, and elastic members 90, 92, 94, 96. Breaker device 1 is a device that is mounted on an object including an electrical circuit and operates to interrupt the electrical circuit when an anomaly occurs in the electrical circuit, a system, or the like in the object, to thereby prevent damage caused by the anomaly from becoming severe. For example, breaker device 1 is mounted on a vehicle, which is one example of the object, and is connected between a motor and a battery (for example, a lithium-ion battery) for driving the motor to interrupt the electrical connection between the motor and the battery for driving the motor at the time of emergency such as an abnormal time or the time of an accident. Note that the object may be other than a vehicle; examples of the object include, but are not limited to, a home appliance and a photovoltaic system.

Igniter 10, which holds gunpowder therein, includes lid portion 11 provided between the gunpowder and pusher 60, is disposed in recess 61, and generates gas. For example, igniter 10 is an electric igniter including: a gunpower portion including an ignition charge; and a conducting pin for passing an electric current through the gunpowder portion. During operation, an operating current for igniting the ignition charge is supplied from an external power supply to the conducting pin, thus the ignition charge is ignited and burnt, and gas (combustion gas) is generated. Note that when recess 61 is formed, breaker device 1 can be reduced in size.

Igniter 10 is fixed to small-diameter portion 21 located at the top of upper casing 20.

Upper casing 20 and lower casing 30, which are members constituting the outer full of breaker device 1, house igniter 10, a portion of each of resin member 40 and conductor 50, pusher 60, protective portion 80, and elastic members 92, 94, 96. Space 70 extending in the up-down direction is formed inside upper casing 20 and lower casing 30. Space 70 is a space formed in the shape of a circular cylinder so that pusher 60 can move therein. Pusher 60 is housed in an area of space 70 that is located at the upper end (on the positive side of the Z-axis) in the up-down direction (the Z-axis direction).

Each of upper casing 20 and lower casing 30 is formed of a metal such as stainless steel (SUS), but may be formed of other metals such as aluminum. The outer shape of each of upper casing 20 and lower casing 30 is, but not limited to, a circular column. Upper casing 20 and lower casing 30 are connected and fixed by welding or the like, for example. Each of upper casing 20 and lower casing 30 is one example of the casing (the cover member).

Upper casing 20, which is one example of the first casing and is a cylinder member having the shape of a circular cylinder with a step, for example, is hollow inside. Upper casing 20 includes: small-diameter portion 21 located in an upper area; large-diameter portion 23 located in a lower area; connecting portion 22 that connects these small-diameter and large-diameter portions; and upper fixing portion 24. Small-diameter portion 21, connecting portion 22, large-diameter portion 23, and upper fixing portion 24 are integrally formed. Small-diameter portion 21 and large-diameter portion 23 are coaxially disposed, and large-diameter portion 23 is larger in diameter than small-diameter portion 21. Small-diameter portion 21, connecting portion 22, and large-diameter portion 23 form first body portion 20*a* which houses igniter 10 and pusher 60 located at the first position.

Upper fixing portion 24, which is a part for fixing upper casing 20 and lower casing 30, is provided so as to protrude downward from first body portion 20*a* (for example, large-diameter portion 23).

Lower casing 30, which is one example of the second casing and is a member having the shape of a hollow cylinder with a closed bottom, includes protruding portion 30*a* that protrudes upward. Specifically, lower casing 30 includes protruding portion 30*a*, bottom portion 33, side wall portion 34, and lower fixing portion 35. Protruding portion 30*a*, bottom portion 33, side wall portion 34, and lower fixing portion 35 are integrally formed. Protruding portion 30*a*, bottom portion 33, and side wall portion 34 form second body portion 30*b* which houses pusher 60 that has moved to the second position and separating portion 51 that has been cut off by pusher 60 that has moved to the second position. Second body portion 30*b* is located below first body portion 20*a*.

Note that in the present specification, being integrally formed indicates at least one of the following: that components are formed of the same material; that components are formed at the same time; and that components are the same object (a single object), for example.

Protruding portion 30*a* is located below separating portion 51 and configured to protrude upward in space 70. Protruding portion 30*a* is connected to one end of bottom portion 33 and protrudes upward (on the positive side of the Z-axis) from bottom portion 33 in space 70. Protruding portion 30*a* is configured to contact pusher 60 that has moved downward by the gas generated by igniter 10 and then deform downward by being pressed by pusher 60. This means that protruding portion 30*a* has the function of absorbing impact (stress) from pusher 60 by deformation.

Protruding portion 30*a* forming the recess of lower casing 30 is exposed as viewed from the outside of breaker device 1 when breaker device 1 is viewed from the negative side of the Z-axis to the positive side of the Z-axis. In the present exemplary embodiment, protruding portion 30*a* is tapered upward in space 70, but the shape of protruding portion 30*a* is not limited to this tapered shape.

Note that in the present specification, coming into contact means the state where stress can be transmitted from one of two members to the other and may represent direct contact between two members or may represent arrangement of two members with another member interposed therebetween such that stress can be transmitted from one of the two members to the other via the other member. For example, contact herein may represent direct contact between protruding portion 30*a* and separating portion 51 or may represent arrangement of protruding portion 30*a* and separating portion 51 such that stress on protruding portion 30*a* can be transmitted to separating portion 51 via another member disposed between protruding portion 30*a* and separating portion 51. In the latter example, for example, arc-extinguishing material may be disposed between protruding portion 30*a* and separating portion 51 or separating portion 51 may be disposed between protruding portion 30*a* and pusher 60.

Bottom portion 33 connects protruding portion 30*a* and side wall portion 34. In other words, protruding portion 30*a* and side wall portion 34*a* are connected via bottom portion 33. Bottom portion 33 has an outer surface and an inner surface each inclining upward from protruding portion 30*a* to side wall portion 34.

Side wall portion 34 is connected to the other end of bottom portion 33 and is formed so as to extend upward from bottom portion 33. Side wall portion 34 has the shape of a cylinder; in the present exemplary embodiment, side wall portion 34 has the shape of a circular cylinder. Side wall portion 34 is disposed coaxially with small-diameter portion 21 and large-diameter portion 23. The diameter of side wall portion 34 is equal to the diameter of large-diameter portion 23, for example.

Lower fixing portion 35, which is a part for fixing upper casing 20 and lower casing 30, is provided so as to protrude upward from second body portion 30*b* (for example, side wall portion 34). Lower fixing portion 35 is provided at a position corresponding to upper fixing portion 24, and is disposed so as to at least partially overlap upper fixing portion 24 as viewed in the radial direction (in the X-axis direction in the cross-sections illustrated in FIG. 2A and FIG. 2B). For example, upper fixing portion 24 and lower fixing portion 35 overlap each other as viewed in the radial direction and are fixed in contact with each other.

In the present embodiment, lower fixing portion 35 is connected (joined) to upper fixing portion 24; for example, lower fixing portion 35 is connected to upper fixing portion 24 by welding. Lower fixing portion 35 is joined to upper fixing portion 24 by welding portion 110. Welding portion 110 is a portion at which lower fixing portion 35 and upper fixing portion 24 are welded. The welding is laser beam welding, but an arbitrary method such as tungsten inert gas (TIG) welding or projection welding may be used.

Note that lower fixing portion 35 may be connected to upper fixing portion 24 using a method other than welding; for example, solder may be used for the connection.

Protruding portion 30*a*, bottom portion 33, side wall portion 34, and lower fixing portion 35 have the same thickness in the present exemplary embodiment, but may have different thicknesses, for example.

Figure 3:
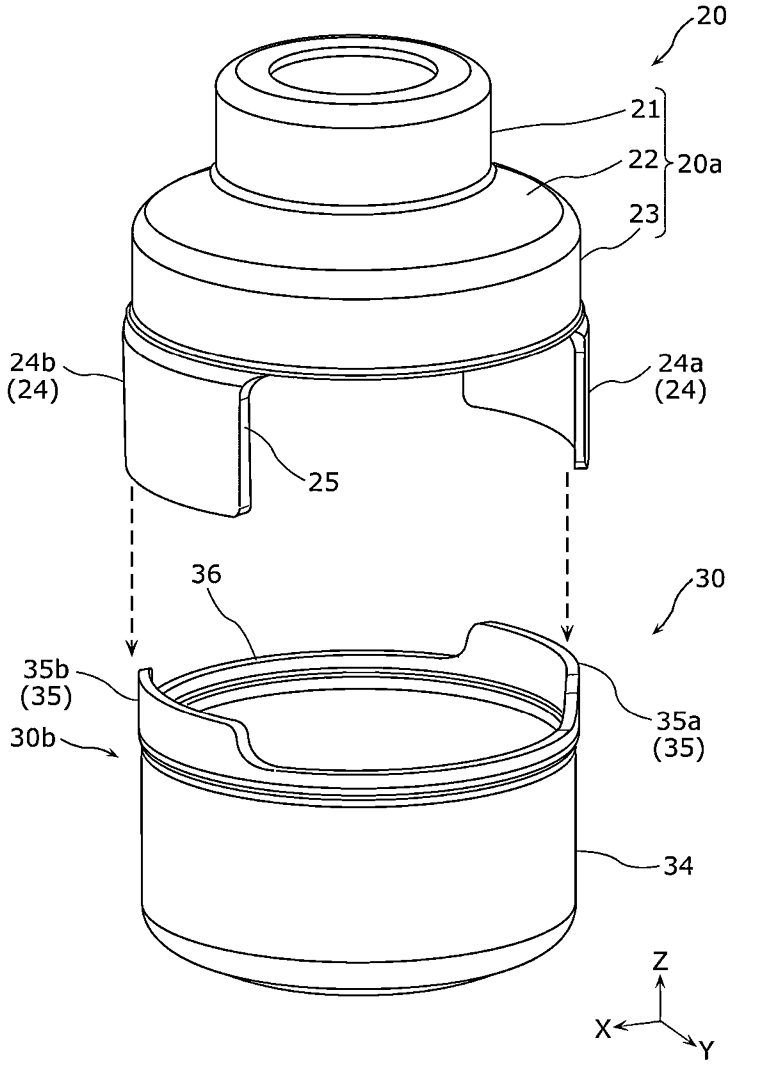
FIG. 3 is an exploded perspective view illustrating an upper casing and a lower casing according to an exemplary embodiment.

Next, upper casing 20 and lower casing 30 will be described with further reference to FIG. 3. FIG. 3 is an exploded perspective view illustrating upper casing 20 and lower casing 30 according to the present exemplary embodiment. Note that FIG. 3 illustrates only upper casing 20 and lower casing 30 among the structural elements of breaker device 1.

As illustrated in FIG. 2A to FIG. 3, FIG. 5, and FIG. 6, upper fixing portion 24 includes first fixing portion 24*a* and third fixing portion 24*b*, and lower fixing portion 35 includes second fixing portion 35*a* and fourth fixing portion 35*b*.

First fixing portion 24*a* and third fixing portion 24*b*, each of which is in the shape of an arc as viewed from above, are provided at opposite positions so as to protrude downward from first body portion 20*a*. Furthermore, as illustrated in FIG. 3, recess 25 is provided between first fixing portion 24*a* and third fixing portion 24*b* in the circumferential direction. Separating portion 51 is disposed in the space surrounded by recesses 25, 36 in the state where lower fixing portion 35 is fixed to upper fixing portion 24. Thus, first fixing portion 24*a* and third fixing portion 24*b* are disposed at opposite ends of separating portion 51 in the width direction (in the X-axis direction).

As illustrated in FIG. 2A to FIG. 3, FIG. 5, and FIG. 6, second fixing portion 35*a* and fourth fixing portion 35*b*, each of which is in the shape of an arc as viewed from above, are provided at opposite positions so as to protrude upward from second body portion 30*b*. Furthermore, as illustrated in FIG. 3, recess 36 is provided between second fixing portion 35*a* and fourth fixing portion 35*b* in the circumferential direction. Thus, second fixing portion 35*a* and fourth fixing portion 35*b* are disposed at opposite ends of separating portion 51 in the width direction (in the X-axis direction).

In the state where lower fixing portion 35 is fixed to upper fixing portion 24, first fixing portion 24*a* and second fixing portion 35*a* overlap at least partially in the radial direction, and third fixing portion 24*b* and fourth fixing portion 35*b* overlap at least partially in the radial direction. As a result, second fixing portion 35*a* can be joined to first fixing portion 24*a* by welding, and fourth fixing portion 35*b* can be joined to third fixing portion 24*b* by welding. Thus, in the present embodiment, welding portions 110 are provided at opposite ends of separating portion 51 in the width direction (in the X-axis direction).

Furthermore, at least one of recesses 25, 36 functions as a guide for positioning separating portion 51 when assembling breaker device 1. This means that when at least one of recesses 25, 36 is provided, assembly of breaker device 1 is made easier.

Note that in the present exemplary embodiment, as illustrated in FIG. 2A to FIG. 3, FIG. 5, and FIG. 6, first fixing portion 24*a* is disposed outward of second fixing portion 35*a* and third fixing portion 24*b* is disposed outward of fourth fixing portion 35*b* in the state where lower fixing portion 35 is fixed to upper fixing portion 24; however, the positional relationship between these fixing portions is not limited to this example.

Figure 5:
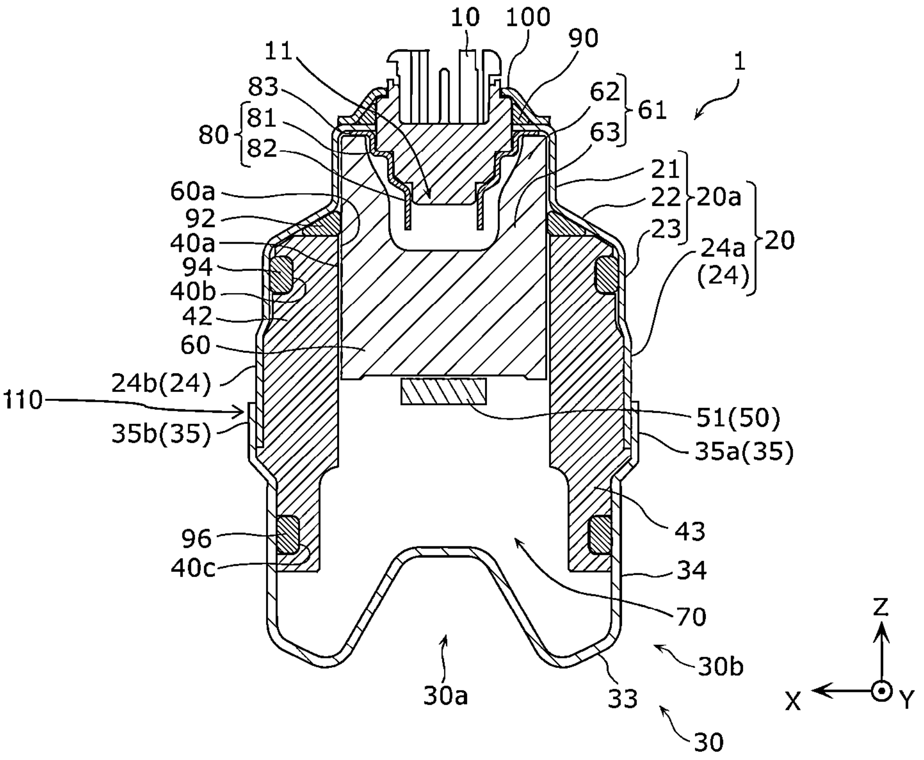
FIG. 5 is a cross-sectional view illustrating the configuration of a breaker device according to a variation of an exemplary embodiment before an interrupting operation.

For example, as illustrated in FIG. 5, second fixing portion 35*a* (lower fixing portion 35) may be disposed outward of first fixing portion 24*a* (upper fixing portion 24), and fourth fixing portion 35*b* (lower fixing portion 35) may be disposed outward of third fixing portion 24*b* (upper fixing portion 24). Furthermore, one of second fixing portion 35*a* and fourth fixing portion 35*b* may be disposed outward of upper fixing portion 24.

Note that radially overlapping parts of first fixing portion 24*a* and second fixing portion 35*a* other than welding portion 110 may or may not be in contact. Similarly, radially overlapping parts of third fixing portion 24*b* and fourth fixing portion 35*b* other than welding portion 110 may or may not be in contact.

Welding portion 110 preferably has a large area from the perspective of effectively distributing stress imposed on protruding portion 30*a*, etc. For example, welding portion 110 may be provided in the shape of an arc. In other words, upper fixing portion 24 and lower fixing portion 35 may be surface-welded. With this, stress imposed on lower casing 30 can be effectively distributed to upper casing 20; thus, deformation of breaker device 1 can be minimized. Furthermore, the strength of breaker device 1 can be improved.

Next, one example of a welding method will be specifically described. Here, the laser beam welding, which is one welding method, will be described. Note that as described above, the laser beam welding is one example of the method in which upper fixing portion 24 and lower fixing portion 35 are welded together; these portions may be welded in another method.

Figure 9A:
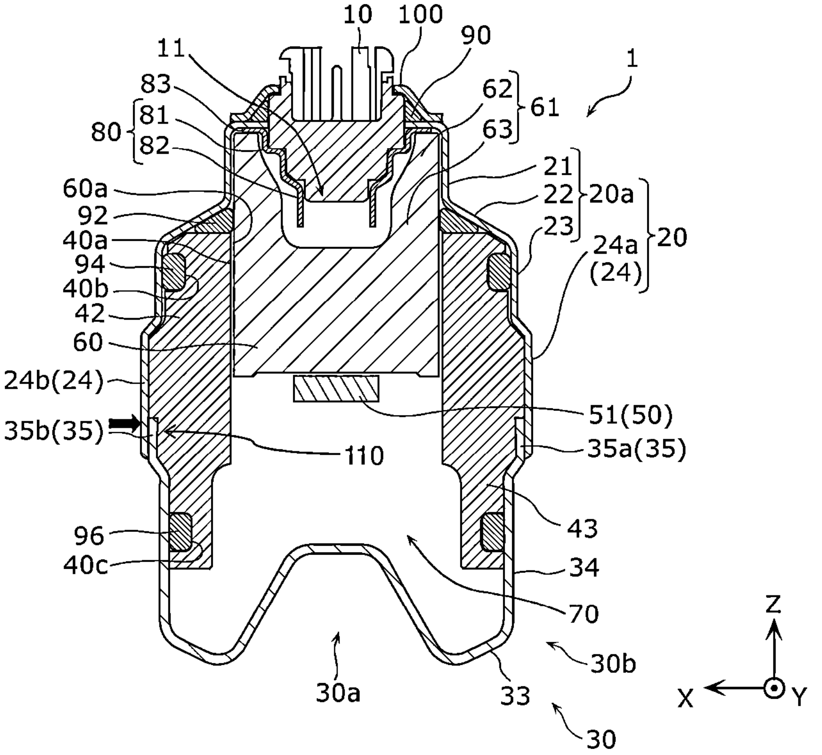
FIG. 9A is a diagram illustrating another welding method for a breaker device according to an exemplary embodiment.
Figure 9B:
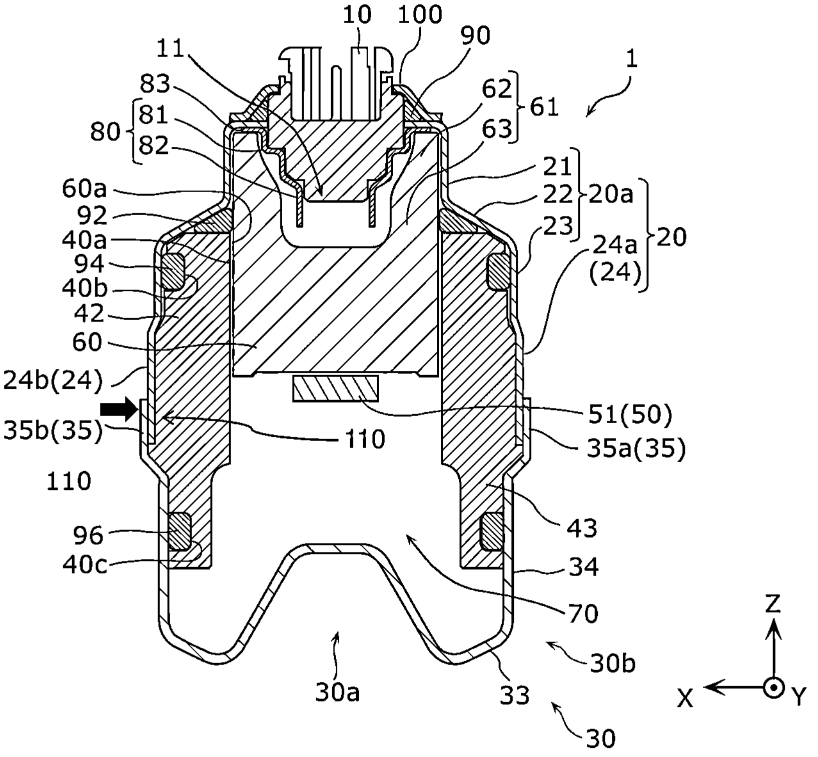
FIG. 9B is a diagram illustrating another welding method for a breaker device according to a variation of an exemplary embodiment.

As indicated by the arrows in FIG. 9A and FIG. 9B, a laser beam is emitted to welding portion 110 in a direction in which upper fixing portion 24 and lower fixing portion 35 overlap each other (in the X-axis direction), and thus upper fixing portion 24 and lower fixing portion 35 are welded together.

Note that as illustrated in FIG. 9A, in the case where upper fixing portion 24 is located outward of lower fixing portion 35, the thickness of upper fixing portion 24 is preferably less than the thickness of lower fixing portion 35. With this configuration, the welding is likely to be deeply achieved, and the area of welding between upper fixing portion 24 and lower fixing portion 35 can be easily increased.

In contrast, as illustrated in FIG. 9B, in the case where upper fixing portion 24 is located inward of lower fixing portion 35, the thickness of lower fixing portion 35 is preferably less than the thickness of upper fixing portion 24. With this configuration, the welding is likely to be deeply achieved, and the area of welding between upper fixing portion 24 and lower fixing portion 35 can be easily increased.

The following will describe another welding method with which the area of welding can be easily increased.

Figure 8A:
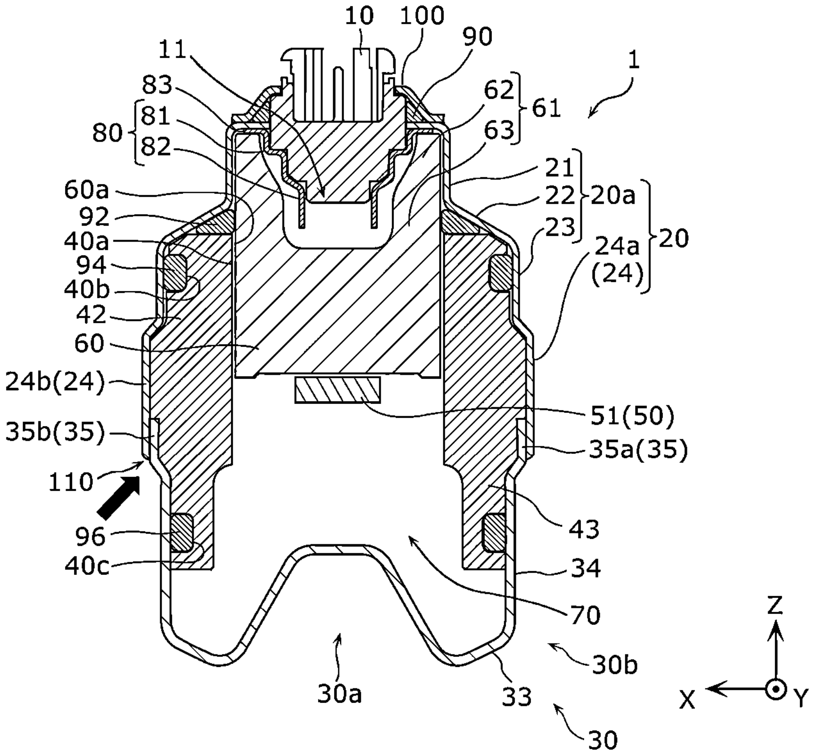
FIG. 8A is a diagram illustrating a welding method for a breaker device according to an exemplary embodiment.

For example, there is a welding method in which a laser beam is emitted to the lower end of upper fixing portion 24 diagonally upward from below (in the direction indicated by the arrow in FIG. 8A). Compared to the welding method in which a laser beam is emitted along the X-axis to the portion at which upper fixing portion 24 and lower fixing portion 35 overlap each other as described with reference to FIG. 9A, it is possible to further increase the area of welding portion 110 with ease at which upper fixing portion 24 and the lower fixing portion are welded together, with the method in which a laser beam is emitted to the lower end of upper fixing portion 24 diagonally upward from below.

Figure 8B:
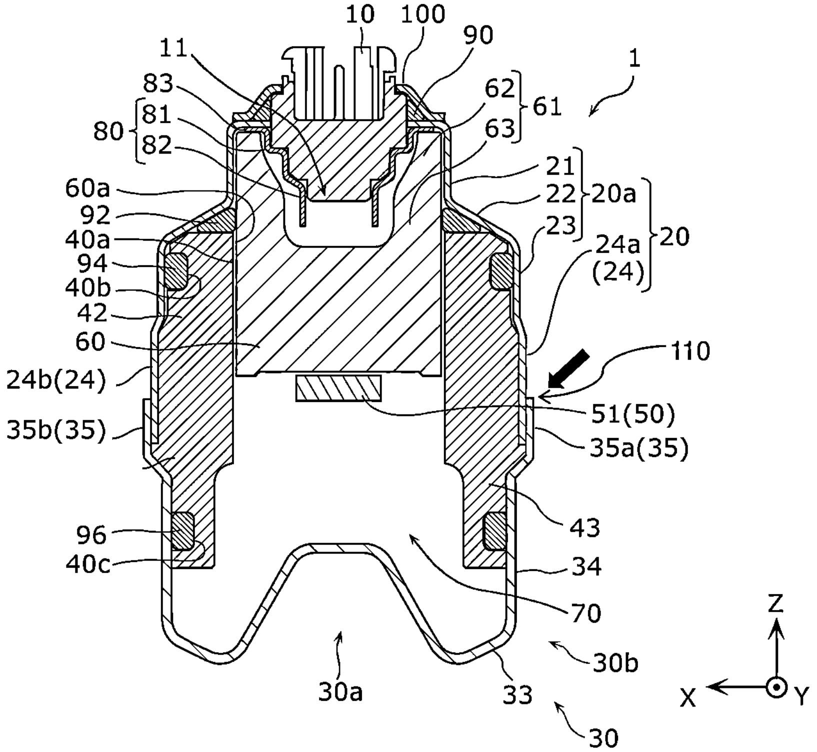
FIG. 8B is a diagram illustrating a welding method for a breaker device according to a variation of an exemplary embodiment.

In contrast, as illustrated in FIG. 8B, in the case where upper fixing portion 24 is located inward of lower fixing portion 35, there is a welding method in which a laser beam is emitted to the upper end of lower fixing portion 35 diagonally downward from above (as indicated by the arrow in FIG. 8B). Compared to the welding method in which a laser beam is emitted along the X-axis to the portion at which upper fixing portion 24 and lower fixing portion 35 overlap each other as described with reference to FIG. 9B, it is possible to further increase the area of welding portion 110 with ease at which upper fixing portion 24 and the lower fixing portion are welded together, with the method in which a laser beam is emitted to the upper end of lower fixing portion 35 diagonally downward from above. With reference back to FIG. 1 to FIG. 2B, FIG. 6, and FIG. 7, details of the configuration of breaker device 1 will be described.

Resin member 40 is a member that covers a portion of conductor 50. Furthermore, resin member 40 is a part of structural elements that form space 70. Resin member 40 includes embedding portion 41, first cylindrical portion 42, and second cylindrical portion 43.

Embedding portion 41 is a part of resin member 40 in which conductor 50 is embedded. Embedding portion 41 is partially exposed from the casing, for example. Embedding portion 41 has a through-hole in which conductor 50 (specifically, holding portion 52) is disposed.

First cylindrical portion 42, which is a part of resin member 40 that is disposed in the casing, is where pusher 60 is disposed during a non-interrupting operation (while no gas is generated by igniter 10). In other words, first cylindrical portion 42 is located between the casing and pusher 60. The inner diameter of first cylindrical portion 42 is less than the inner diameter of second cylindrical portion 43.

Second cylindrical portion 43, which is a part of resin member 40 that is disposed in the casing, is a part located below first cylindrical portion 42. The inner diameter of second cylindrical portion 43 is greater than the inner diameter of first cylindrical portion 42. Thus, the volume of the lower area of space 70 can be made large. This makes it possible to reduce an increase in the pressure inside the casing that is caused by the gas generated by igniter 10 and the following movement of pusher 60, meaning that the deformation of breaker device 1 can be minimized.

In this manner, pusher 60 moves in space 70 formed by first cylindrical portion 42 and second cylindrical portion 43. Note that first cylindrical portion 42 and second cylindrical portion 43 are not limited to having different inner diameters and may have the same inner diameter.

Furthermore, resin member 40 includes inner side wall 40*a*, first outer side wall 40*b*, and second outer side wall 40*c*. First outer side wall 40*b* and second outer side wall 40*c* are walls of the recesses formed in the circumferential direction on the outer side wall of resin member 40.

Inner side wall 40*a*, which is the inner surface of resin member 40, faces outer side wall 60*a* of pusher 60.

First outer side wall 40*b* is a part disposed in the casing, at a level above separating portion 51, and covered by upper casing 20. First outer side wall 40*b* is circumferentially provided so as to face large-diameter portion 23 in a cross-sectional view.

Second outer side wall 40*c* is a part disposed in the casing, at a level below separating portion 51, and covered by lower casing 30. Second outer side wall 40*c* is circumferentially provided so as to face side wall portion 34 in a cross-sectional view.

Conductor 50 is an electrically conductive metal body that is partially located in upper casing 20 and lower casing 30. When breaker device 1 is mounted on a predetermined electrical circuit, conductor 50 forms a part of said electrical circuit and is also referred to as a busbar. Conductor 50 is a flat member held on resin member 40 and disposed so as to cross the interior of each of upper casing 20 and lower casing 30. Conductor 50 includes separating portion 51 and holding portion 52.

Conductor 50 can be formed of a metal such as copper (Cu), for example. Note that conductor 50 may be formed of a metal other than copper or may be formed of an alloy of copper and another metal. For example, conductor 50 may contain manganese (Mn), nickel (Ni), platinum (Pt), or the like.

Separating portion 51, which is a part of conductor 50 that is cut off by pusher 60 under the pressure of the gas generated by igniter 10, is located below pusher 60 at the initial position.

Holding portion 52 is a part of conductor 50 that is held by resin member 40. Holding portion 52 is a part that does not overlap pusher 60 as viewed from above; for example, holding portion 52 is a part that overlaps resin member 40 as viewed from above and is a part located outside of the casing. Holding portion 52 remains held by resin member 40 even after separating portion 51 is cut off.

Pusher 60 is positioned below igniter 10 and disposed so as to be able to move downward and, for example, when an anomaly occurs in the system, moves downward to cut conductor 50 and interrupt the flow of an electric current through the electrical circuit as an emergency measure. Thus, pusher 60 is configured to cut off separating portion 51 from conductor 50 under the pressure of the gas generated by igniter 10. As described, pusher 60 is disposed at a first position between separating portion 51 and igniter 10 (refer to FIG. 2A) and moves from the first position to a second position located below the first position by cutting off separating portion 51 on the way. The second position is, for example, the position of pusher 60 when separating portion 51 comes into contact with protruding portion 30*a* after pusher 60 moves downward together with separating portion 51.

Pusher 60 is formed from an insulating member such as a synthetic resin, for example. In the present exemplary embodiment, pusher 60 is formed from nylon. Pusher 60 has the shape of a circular column with an outer diameter corresponding to the inner diameter of small-diameter portion 21 of upper casing 20. Furthermore, pusher 60 includes recess 61, and igniter 10 is disposed inside recess 61. Note that the shape of pusher 60 is not limited to said shape and can be changed, as appropriate, according to the shape, etc., of each of upper casing 20 and lower casing 30. Recess 61 is an upper portion of pusher 60 where a recess directed downward is provided.

In the example illustrated in FIG. 2A, recess 61 is a portion with a lateral surface surrounded by small-diameter portion 21 and connecting portion 22 in the state where breaker device 1 has not performed the interrupting operation.

Recess 61 includes: first portion 62 having a diameter (for example, an inner diameter) greater than the diameter of first cylindrical portion 81 of protective portion 80; and second portion 63 located below first portion 62 and having a diameter (for example, an inner diameter) greater than the diameter of second cylindrical portion 82, as viewed from above. The diameter of first portion 62 is greater than the diameter of second portion 63 as viewed from above. For example, in a cross-sectional view, the inner wall of first portion 62 is tapered with a diameter reduced toward second portion 63, but may be, for example, in the shape of a staircase with a diameter reduced stepwise.

Protective portion 80 is a structural element for protecting pusher 60 from being damaged by lid portion 11 of igniter 10 when igniter 10 generates gas. Specifically, protective portion 80 is a member serving as a barrier to a part of lid portion 11 that may open wide, to reduce the occurrence of said part opened as a result of the gas generation by igniter 10 coming into contact with pusher 60 and damaging recess 61 of pusher 60.

Protective portion 80 is provided on the casing (for example, upper casing 20) or igniter 10 and includes a part located inside recess 61. In the present exemplary embodiment, protective portion 80 is provided on the casing (specifically, small-diameter portion 21). Protective portion 80 is fixed to small-diameter portion 21 by welding, for example, but the fixing method is not limited to welding.

As illustrated in FIG. 2A and FIG. 2B, protective portion 80 includes first cylindrical portion 81 and second cylindrical portion 82. First cylindrical portion 81 and second cylindrical portion 82 are integrally formed.

First cylindrical portion 81, which is a part in the shape of a cylinder surrounding the lateral side of igniter 10, has a shape corresponding to igniter 10. In the present exemplary embodiment, first cylindrical portion 81 is formed in the shape of a staircase (for example, in the form of a two-step staircase), the diameter (for example, the inner diameter) of which is reduced stepwise downward in a cross-sectional view. Note that the shape of first cylindrical portion 81 is not limited to this shape; for example, first cylindrical portion 81 may be tapered with a diameter reduced downward or may have another shape.

First cylindrical portion 81 may be at least partially in contact with igniter 10. Second cylindrical portion 82 is disposed at the lower end of first cylindrical portion 81.

First cylindrical portion 81 includes flange portion 83 at the top. Flange portion 83, which is a ring-shaped part (for example, a plate-shaped member) formed so as to protrude outward from the upper end of first cylindrical portion 81 as viewed from above, is fixed to small-diameter portion 21 by welding or the like. At least a part of flange portion 83 is disposed between first portion 62 and small-diameter portion 21, for example. Thus, first cylindrical portion 81 includes a part connected to the casing and is fixed to the casing.

Second cylindrical portion 82 is a ring-shaped part located below first cylindrical portion 81 and having a diameter (for example, an inner diameter) less than the diameter of first cylindrical portion 81. Second cylindrical portion 82 is a part that protrudes straight from the lower end of first cylindrical portion 81 on the negative side of the Z-axis and when the gas is generated, comes into contact with lid portion 11. The lower end (the end located on the negative side of the Z-axis, that is, the lowest end, for example) of second cylindrical portion 82 is located at a level below (on the negative side of the Z-axis from) the lower end (the end located on the negative side of the Z-axis, that is, the lowest end, for example) of lid portion 11 in the state where no gas is generated.

Protective portion 80 is formed of a metal such as stainless steel (SUS), for example, but may be formed of other metals such as aluminum or may be formed of a resin (for example, a resin different from that of pusher 60).

As illustrated in FIG. 2A, FIG. 2B, FIG. 6, and FIG. 7, resin members 90, 92, 94, 96, which are elastic members such as rubber, are O-rings each formed in the shape of a ring. Each of elastic members 90, 92, 94, 96 is disposed in the state of being pressed (a deformed state).

Elastic member 90 is disposed in the space formed between small-diameter portion 21, igniter 10, and fixing member 100 for fixing igniter 10 disposed in recess 61. Elastic member 90 is in contact with each of fixing member 100, igniter 10, and small-diameter portion 21 and, for example, is pressed by each of fixing member 100, igniter 10, and small-diameter portion 21.

Elastic member 92 is disposed to be positioned between the casing and pusher 60 in such a manner as to be pressed against the casing and press the outer side surface (for example, outer side wall 60*a*) of pusher 60. Elastic member 92 is disposed so as to extend along the outer side surface of pusher 60. In the present exemplary embodiment, elastic member 92 is disposed in the space formed between the casing (for example, connecting portion 22), pusher 60, and resin member 40 in order to keep the internal space of recess 61 and the space exterior to said internal space (for example, the space between pusher 60 and resin member 40) from being spatially connected. Elastic member 92 reduces the leakage of the gas generated by igniter 10 from the internal space of recess 61 to the exterior space. With this, it is possible to minimize a reduction in the pressure of the gas inside recess 61 that is due to the gas generated by igniter 10 escaping from the internal space of recess 61.

In the present exemplary embodiment, elastic member 92 is in contact (for example, surface contact) with the casing, pusher 60, and resin member 40 and, for example, is pressed by each of the casing, pusher 60, and resin member 40.

The shape of a cross section of elastic member 92 when pressed is triangular, but is not limited to this shape. The shape of the cross section of elastic member 92 when not pressed is not limited as long as the internal space of recess 61 and conductor 50 can be spatially separated after pressing; said shape may be a circle, may be a polygon (for example, a square), or may be an ellipse.

Note that in the present specification, the meaning of the term "pressing" includes, in addition to a situation where one member presses the other member, a situation where with a repulsive force generated as a result of elastic deformation of said other member, said other member presses said one member or another member.

Elastic member 94, which is one example of the first elastic member, is disposed in the space formed above conductor 50, between the casing (for example, large-diameter portion 23) and a circumferential recess formed on resin member 40, in order to keep the exterior space and the space located above conductor 50 from being spatially connected. In the present exemplary embodiment, elastic member 94 is in contact with each of first outer side wall 40*b* of resin member 40 and large-diameter portion 23 and, for example, is pressed by each of first outer side wall 40*b* of resin member 40 and large-diameter portion 23.

When the internal pressure in the casing increases due to, for example, gas generated by igniter 10 or an electric arc generated when pusher 60 cuts off separating portion 51, resin member 40 is pressed to the outside of breaker device 1, and upper casing 20 is pressed upward and squeezes resin member 40 because of the structure in which the overlapping portions of upper casing 20 and lower casing 30 are fixed. Therefore, with resin member 40 and upper casing 20, elastic member 94 is further pressed compared to the initial state. This makes it possible to reduce leakage of high-temperature gas to the outside of breaker device 1 through the spacing between upper casing 20 and resin member 40.

Elastic member 96, which is one example of the second elastic member, is disposed in the space formed below conductor 50, between lower casing 30 (for example, side wall portion 34) and a circumferential recess formed on resin member 40, in order to keep the exterior space and the space located below conductor 50 from being spatially connected. In the present exemplary embodiment, elastic member 96 is in contact with each of second outer side wall 40*c* of resin member 40 and side wall portion 34 and, for example, is pressed by each of second outer side wall 40*c* of resin member 40 and side wall portion 34.

When the internal pressure in the casing increases due to, for example, gas generated by igniter 10 or an electric arc generated when pusher 60 cuts off separating portion 51, resin member 40 is pressed to the outside of breaker device 1, and lower casing 30 is pressed downward and squeezes resin member 40 because of the structure in which the overlapping portions of upper casing 20 and lower casing 30 are fixed. Therefore, with resin member 40 and lower casing 30, elastic member 96 is further pressed compared to the initial state. This makes it possible to reduce leakage of high-temperature gas to the outside of breaker device 1 through the spacing between lower casing 30 and resin member 40.

Note that elastic members 94, 96 are not limited to being disposed in the circumferential recesses without spacing; spacing may be formed in at least one of the up and down directions.

[2. Method for Manufacturing Breaker Device]

Figure 4:
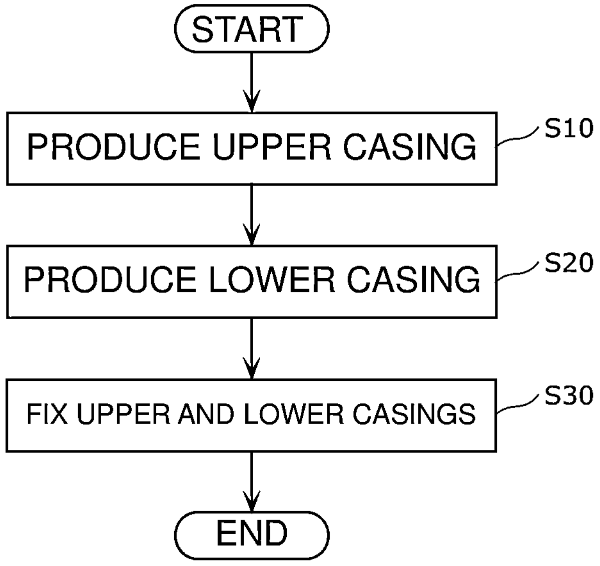
FIG. 4 is a flowchart illustrating a manufacturing process of a breaker device according to an exemplary embodiment.

Next, the method for manufacturing breaker device 1 configured as described above will be described with reference to FIG. 4. FIG. 4 is a flowchart illustrating a manufacturing process of breaker device 1 according to the present exemplary embodiment.

As illustrated in FIG. 4, upper casing 20 is produced by molding or the like (S10), and lower casing 30 is produced by molding or the like (S20). Note that Step S20 may be performed first so that Step S10 is performed after Step S20 or Step S10 and Step S20 may be performed in parallel.

In Step S10, protective portion 80 is further provided on upper casing 20. For example, protective portion 80 is fixed to upper casing 20 by welding or the like. Furthermore, in Step S20, protruding portion 30*a* is formed at the same time as lower casing 30 is produced by molding.

Next, upper casing 20 and lower casing 30 are fixed (S30). For example, upper casing 20 and lower casing 30 are fixed by welding or the like in the state where igniter 10, resin member 40, conductor 50, pusher 60, protective portion 80, and elastic members 90, 92, 94, 96 are housed in these casings. For example, first fixing portion 24*a* and second fixing portion 35*a* are joined together by welding, and third fixing portion 24*b* and fourth fixing portion 35*b* are joined together by welding; thus, lower casing 30 is fixed to upper casing 20. As a result, breaker device 1 described above is produced.

It is sufficient that in Step S30, at least one of the set of first fixing portion 24*a* and second fixing portion 35*a* and the set of third fixing portion 24*b* and fourth fixing portion 35*b* be fixed by welding or the like. While the welding is performed in the circumferential direction at the radially overlapping parts of first fixing portion 24*a* and second fixing portion 35*a*, the welding may be performed in the entire circumferential area at the radially overlapping parts or may be performed only a portion of the circumferential area at the radially overlapping parts.

(Configuration of Another Breaker Device)

Figure 10:
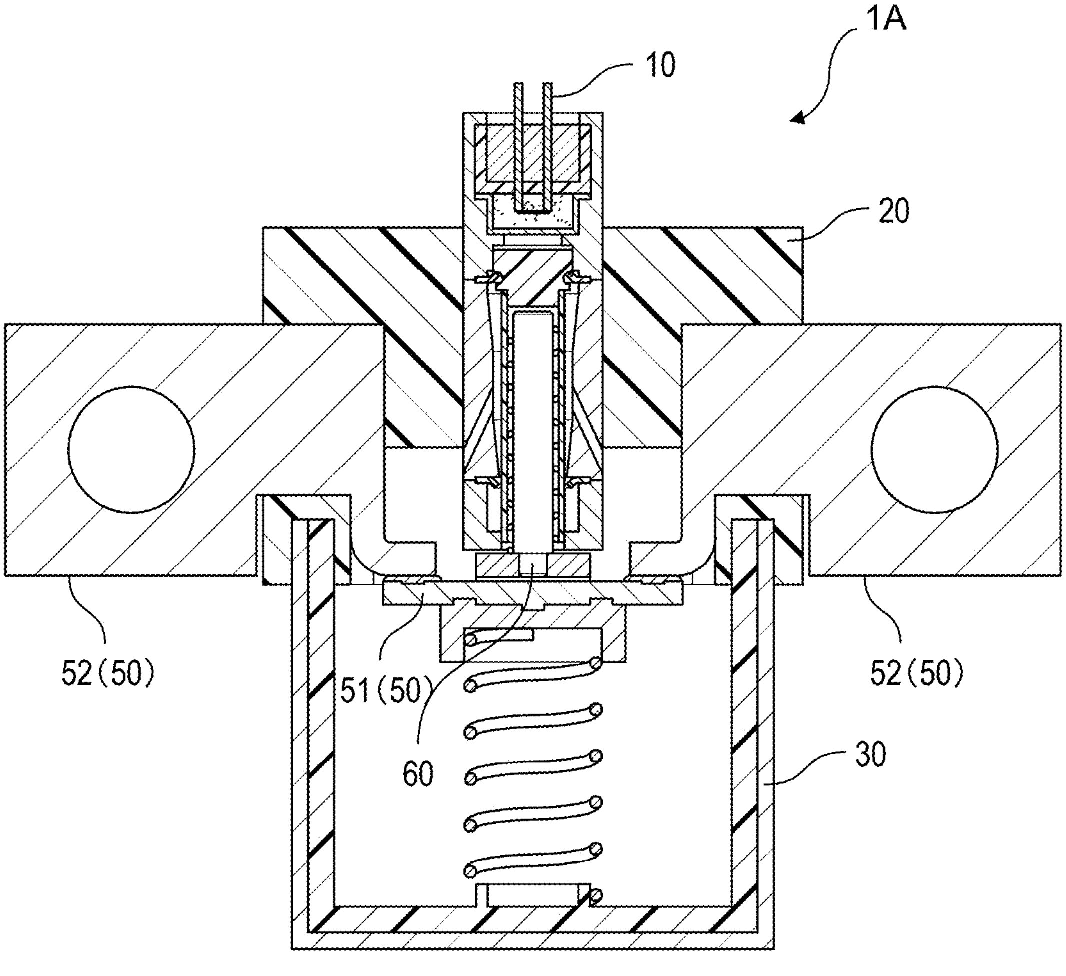
FIG. 10 is a cross-sectional view illustrating the configuration of a breaker device according to another exemplary embodiment before an interrupting operation.
Figure 11:
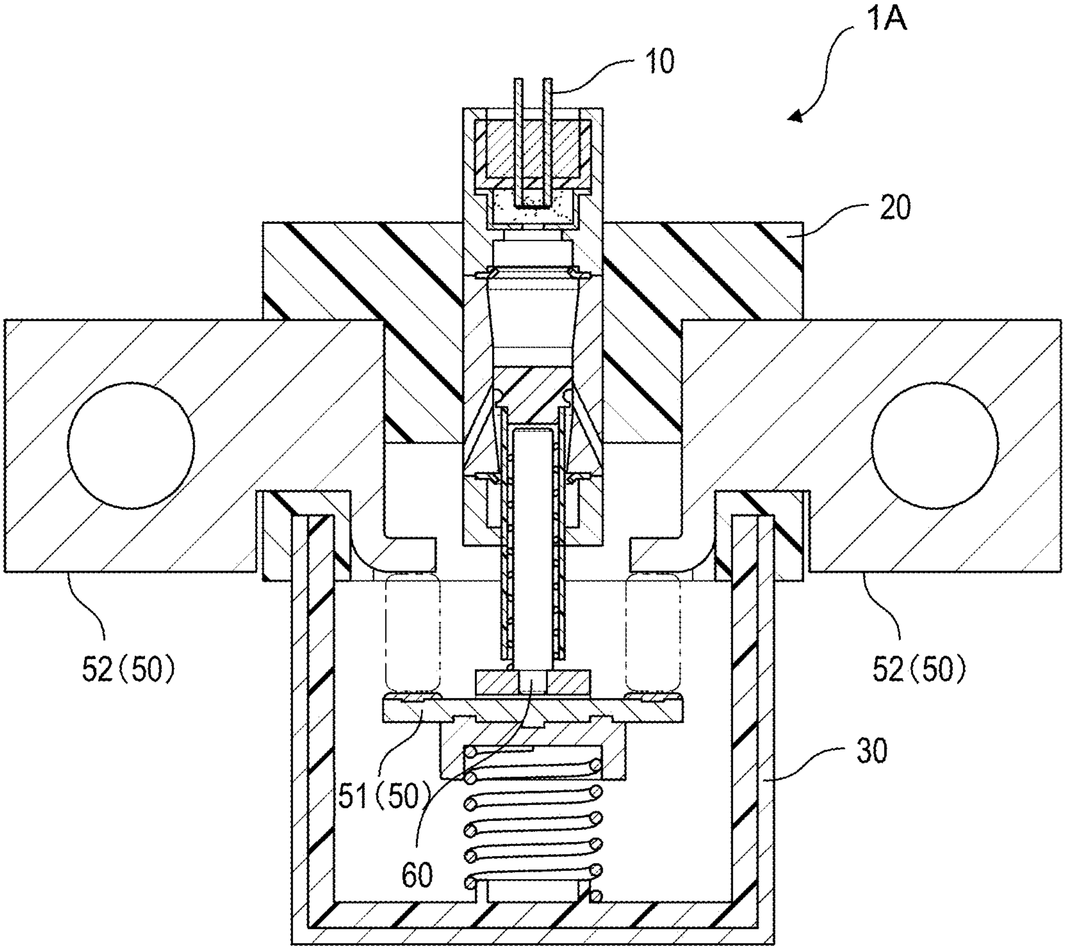
FIG. 11 is a cross-sectional view illustrating the configuration of a breaker device according to another exemplary embodiment after an interrupting operation.

Next, breaker device 1A in which separating portion 51 has a different structure will be described with reference to FIG. 10 and FIG. 11. FIG. 10 is a cross-sectional view illustrating the configuration of breaker device 1A according to another exemplary embodiment before an interrupting operation. FIG. 11 is a cross-sectional view illustrating the configuration of breaker device 1A according to another exemplary embodiment illustrated in FIG. 10 after the interrupting operation. Note that in FIG. 10 and FIG. 11, elements that are substantially the same as those in breaker device 1 described above will be assigned the same reference signs as those in breaker device 1, and description of the elements will be omitted.

In breaker device 1 described above, pusher 60 cuts off separating portion 51 from conductor 50 under the pressure of the gas generated by igniter 10, and thus separating portion 51 moves downward. In other words, when separating portion 51 is cut off from holding portion 52, the electrical connection between separating portion 51 and holding portion 52 is cut off and as a result, conductor 50 becomes non-conducting. However, the breaker device according to the present disclosure does not necessarily need to be configured to cut off separating portion 51.

For example, as illustrated in FIG. 10 and FIG. 11, pusher 60 may move the separating portion downward under the pressure of the gas generated by igniter 10 and thereby place conductor 50 in a non-conducting state. In other words, separating portion 51 in contact with holding portion 52 may be moved downward so that separating portion 51 is separated from holding portion 52, to place conductor 50 in a non-conducting state.

OTHER EXEMPLARY EMBODIMENTS

The breaker devices according to one or more aspects have been described thus far on the basis of the exemplary embodiment, but the present disclosure is not limited to the exemplary embodiment. Various modifications to the present exemplary embodiment and forms configured by combining structural elements in different exemplary embodiments that can be conceived by those skilled in the art may be included within the present disclosure as long as these do not depart from the essence of the present disclosure.

For example, the above exemplary embodiment has described an example in which the first fixing portion and the second fixing portion protrude in the Z-axis direction, but this is not limiting; the first fixing portion and the second fixing portion may protrude at an acute angle relative to the Z-axis direction.

The order of the steps in the method for manufacturing the breaker device described in the above exemplary embodiment may be changed. Furthermore, the steps in the method for manufacturing the breaker device described in the above exemplary embodiment may be performed in a single step or may be performed in separate steps. Note that the phrase “the steps are performed in a single step” is intended to include a situation in which the steps are performed using a single device, a situation in which the steps are sequentially performed, and a situation in which the steps are performed at the same location. The term “separate steps” is intended to include a situation in which the steps are performed using separate devices, a situation in which the steps are performed at different times (for example, on different days), and a situation in which the steps are performed at different locations.

INDUSTRIAL APPLICABILITY

The present disclosure is useful in breaker devices that are disposed in an electrical circuit or the like.

REFERENCE SIGNS LIST

1, 1A breaker device
10 igniter
11 lid portion
20 upper casing (first casing)
20*a* first body portion
21 small-diameter portion
22 connecting portion
23 large-diameter portion
24 upper fixing portion
24*a* first fixing portion
24*b* third fixing portion
25, 36, 61 recess
30 lower casing (second casing)
30*a* protruding portion
30*b* second body portion
33 bottom portion
34 side wall portion
35 lower fixing portion
35*a* second fixing portion
35*b* fourth fixing portion
40 resin member
40*a* inner side wall
40*b* first outer side wall
40*c* second outer side wall
41 embedding portion
42, 81 first cylindrical portion
43, 82 second cylindrical portion
50 conductor
51 separating portion
52 holding portion
60 pusher
60 outer side wall
62 first portion
63 second portion
70 space
80 protective portion
83 flange portion
90, 92 elastic member
94 elastic member (first elastic member)
96 elastic member (second elastic member)
100 fixing member
110 welding portion

The invention claimed is:

1. A breaker device comprising:

a casing;

an igniter disposed in the casing;

a conductor including a separating portion disposed below the igniter;

a pusher located between the separating portion and the igniter and configured to move together with the separating portion from a first position to a second position located below the first position; and a resin member in which the conductor is embedded and covered by the casing, wherein:

the casing includes:

a first casing that is made of a metal, includes a first body portion and a first fixing portion, and is configured to house the igniter and the pusher located at the first position; and a second casing that is made of a metal, includes a second body portion and a second fixing portion, and is configured to house the pusher that has moved to the second position and the separating portion that has moved downward together with the pusher, the first casing and the second casing are coupled to each other, thereby forming the casing having an outer surface, the first fixing portion protrudes downward from a part of the first body portion, the second fixing portion protrudes upward from a part of the second body portion, and the casing is constructed such that:

(i) an inner surface of the first fixing portion and an outer surface of the second fixing portion overlap each other, come into contact with each other, and are fixed to each other, the outer surface of the casing comprises an outer surface of the first fixing portion that is continuous from an outer surface of the first body portion, a bottom end surface of the first fixing portion extending toward the second fixing portion is exposed, and an upper end surface of the second fixing portion is in contact with the resin member, or (ii) an outer surface of the first fixing portion and an inner surface of the second fixing portion overlap each other, come into contact with each other, and are fixed to each other, the outer surface of the casing comprises an outer surface of the second fixing portion that is continuous from an outer surface of the second body portion, an upper end surface of the second fixing portion extending toward the first fixing portion is exposed, and a bottom end surface of the first fixing portion is in contact with the resin member.

2. The breaker device according to claim 1, wherein:

the first body portion is configured to house the igniter and the pusher located at the first position, and the second body portion is located below the first body portion and is configured to house the pusher that has moved to the second position and the separating portion that has moved downward together with the pusher.

3. The breaker device according to claim 2, wherein:

the first casing further includes:

a third fixing portion that protrudes downward from another part of the first body portion and opposes and is apart from the first fixing portion, and the second casing further includes:

a fourth fixing portion that protrudes upward from another part of the second body portion, opposes and is apart from the second fixing portion, overlaps the third fixing portion, comes into contact with the third fixing portion, and is fixed to the third fixing portion.

4. The breaker device according to claim 1, further comprising a first elastic member, wherein:

the resin member includes an inner side wall facing an outer side wall of the pusher and a first outer side wall disposed in the casing and covered by the first casing, and the first elastic member is disposed between the first casing and the first outer side wall of the resin member.

5. The breaker device according to claim 1, further comprising a second elastic member, wherein:

the resin member includes a second outer side wall disposed in the casing and covered by the second casing, and the second elastic member is disposed between the second casing and the second outer side wall of the resin member.

6. The breaker device according to claim 1, wherein the inner surface of the first fixing portion and the outer surface of the second fixing portion overlap each other.

7. The breaker device according to claim 1, wherein the outer surface of the first fixing portion and the inner surface of the second fixing portion overlap each other.

8. The breaker device according to claim 1, wherein after the pusher cuts off the separating portion from the conductor, the separating portion moves downward together with the pusher.

9. The breaker device according to claim 1, wherein the first fixing portion and the second fixing portion are welded to each other.

10. The breaker device according to claim 1, wherein in case of (i), the first fixing portion surrounds the second fixing portion, or in case of (ii), the second fixing portion surrounds the first fixing portion.

11. A breaker device comprising:

a casing;

an igniter disposed in the casing;

a conductor including a separating portion disposed below the igniter; and a pusher located between the separating portion and the igniter and configured to move together with the separating portion from a first position to a second position apart from the first position, wherein:

the casing includes:

a first casing that is made of a metal, includes a first body portion, a first fixing portion and a second fixing portion, and is configured to house the igniter and the pusher located at the first position; and a second casing that is made of a metal, includes a second body portion, a third fixing portion and a fourth fixing portion, and is configured to house the pusher that has moved to the second position and the separating portion that has moved together with the pusher, the first fixing portion protrudes from a first part of the first body portion toward the second casing, the second fixing portion protrudes from a second part of the first body portion toward the second casing, the second part being located at an opposite side of the first part of the first body portion, the third fixing portion protrudes from a first part of the second body portion toward the first casing, the fourth fixing portion protrudes from a second part of the second body portion toward the first casing, the second part being located at an opposite side of the first part of the second body portion, and the casing is constructed such that:

(i) an inner surface of the first fixing portion and an outer surface of the third fixing portion overlap each other, come into contact with each other, and are fixed to each other, an inner surface of the second fixing portion and an outer surface of the fourth fixing portion overlap each other, come into contact with each other, and are fixed to each other, and, when viewed from above, a first largest distance between the inner surface of the first fixing portion and the inner surface of the second fixing portion is equal to or greater than a largest dimension of the second casing along a first line constituting the first largest distance, or (ii) an outer surface of the first fixing portion and an inner surface of the third fixing portion overlap each other, come into contact with each other, and are fixed to each other, an outer surface of the second fixing portion and an inner surface of the fourth fixing portion overlap each other, come into contact with each other, and are fixed to each other, and, when viewed from below, a second largest distance between the inner surface of the third fixing portion and the inner surface of the fourth fixing portion is equal to or greater than a largest dimension of the first casing along a second line constituting the second largest distance.

12. The breaker device according to claim 11, wherein:
the first body portion is configured to house the igniter and the pusher located at the first position, and
the second body portion is located below the first body portion and is configured to house the pusher that has moved to the second position and the separating portion that has moved together with the pusher.

13. The breaker device according to claim 11, further comprising:
a first elastic member; and
a resin member in which the conductor is embedded, wherein:
the resin member includes an inner side wall facing an outer side wall of the pusher and a first outer side wall disposed in the casing and covered by the first casing, and
the first elastic member is disposed between the first casing and the first outer side wall of the resin member.

14. The breaker device according to claim 13, further comprising:
a second elastic member, wherein:
the resin member includes a second outer side wall disposed in the casing and covered by the second casing, and
the second elastic member is disposed between the second casing and the second outer side wall of the resin member.

15. The breaker device according to claim 11, wherein:
the inner surface of the first fixing portion and the outer surface of the third fixing portion overlap each other, and
the inner surface of the second fixing portion and the outer surface of the fourth fixing portion overlap each other.

16. The breaker device according to claim 11, wherein:
the outer surface of the first fixing portion and an inner surface of the third fixing portion overlap each other, and
the outer surface of the second fixing portion and an inner surface of the fourth fixing portion overlap each other.

17. The breaker device according to claim 11, wherein
after the pusher cuts off the separating portion from the conductor, the separating portion moves together with the pusher.

18. The breaker device according to claim 11, wherein the first fixing portion and the third fixing portion are welded to each other, and the second fixing portion and the fourth fixing portion are welded to each other.

19. A breaker device comprising:
a casing;
an igniter disposed in the casing;
a conductor including a separating portion disposed below the igniter; and
a pusher located between the separating portion and the igniter and configured to move together with the separating portion from a first position to a second position located below the first position, wherein:
the casing includes:
a first casing that is made of a metal, includes a first body portion and a first fixing portion, and is configured to house the igniter and the pusher located at the first position; and
a second casing that is made of a metal, includes a second body portion and a second fixing portion, and is configured to house the pusher,
the first fixing portion protrudes from a part of the first body portion toward the second casing,
the second fixing portion protrudes from a part of the second body portion toward the first casing,
the first casing and the second casing are coupled to each other, thereby forming the casing having an outer surface,
the casing is constructed such that:
(i) an inner surface of the first fixing portion and an outer surface of the second fixing portion overlap each other, come into contact with each other, and are fixed to each other, the first fixing portion includes a first overlap portion consisting of all regions that the first casing is in contact with the outer surface of the second fixing portion, and an entirety of an outer surface of the first casing at the first overlap portion is exposed outside so as to constitute a part of the outer surface of the casing, or
(ii) an outer surface of the first fixing portion and an inner surface of the second fixing portion overlap each other, come into contact with each other, and are fixed to each other, the second fixing portion includes a second overlap portion consisting of all regions that the second casing is in contact with the outer surface of the first fixing portion, and an entirety of an outer surface of the second fixing portion at the second overlap portion is exposed outside so as to constitute a part of the outer surface of the casing.

20. The breaker device according to claim 19, wherein the first fixing portion and the second fixing portion are welded to each other.

* * * * *